March 25, 1969  P. J. SCAGLIONE  3,434,754
TWO-PIECE CAR TRUNK COVER
Filed Dec. 1, 1967  Sheet 1 of 3
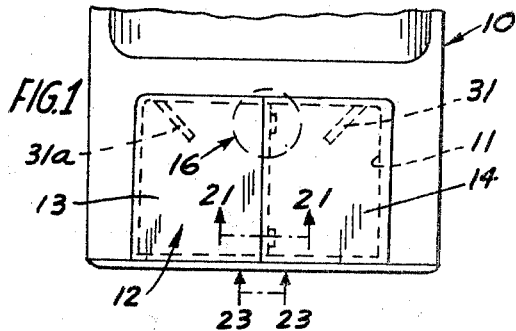
FIG.1
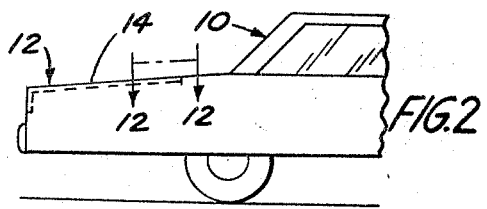
FIG.2
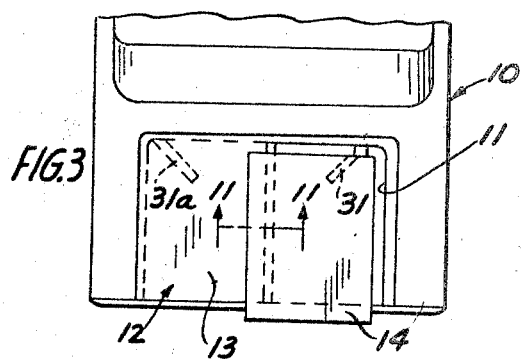
FIG.3
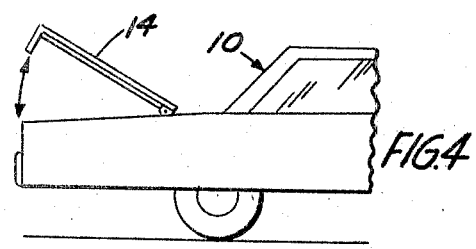
FIG.4
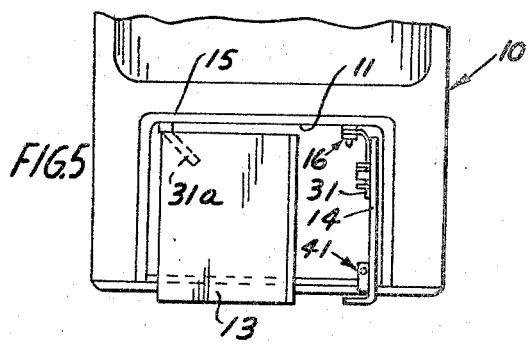
FIG.5
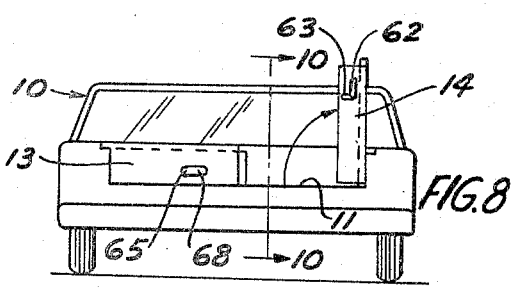
FIG.6
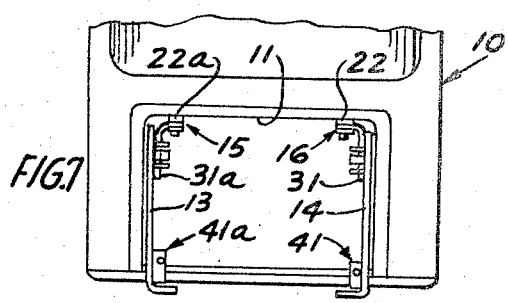
FIG.7
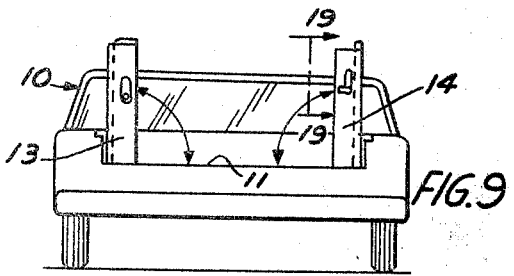
FIG.8 / FIG.9
INVENTOR.
PAUL J. SCAGLIONE
BY
Donnelly, Mentag & Harrington
ATTORNEYS

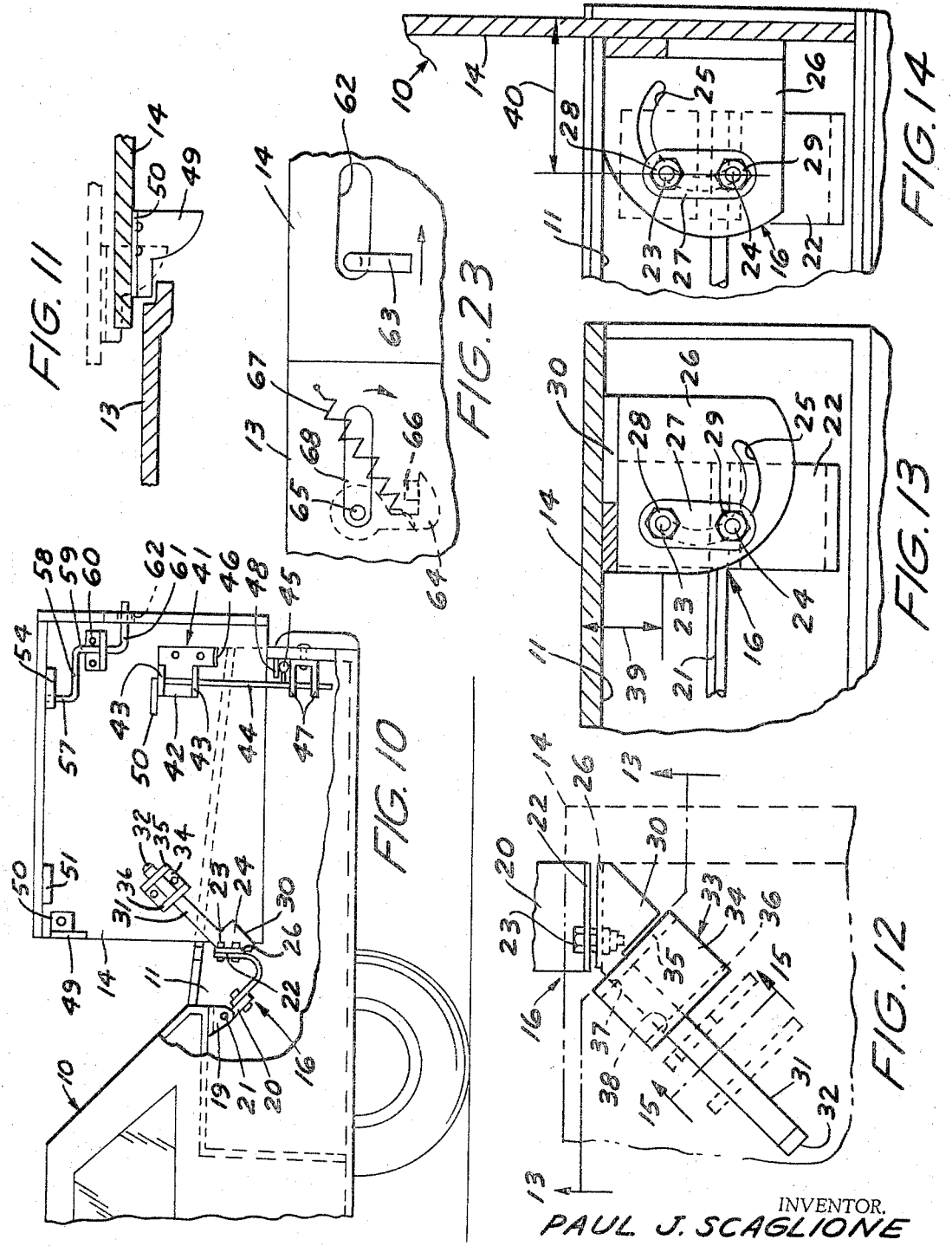

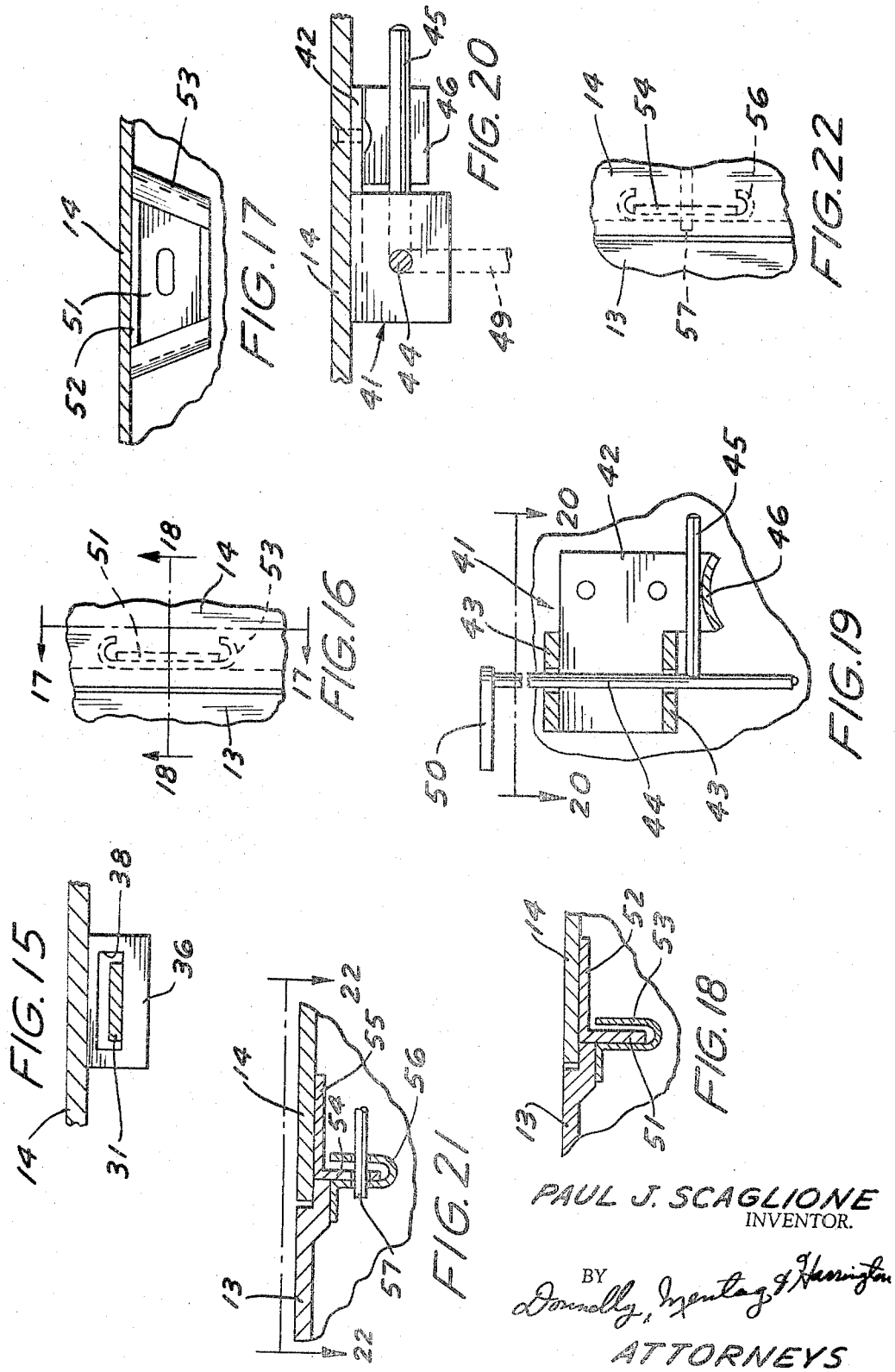

United States Patent Office 3,434,754
Patented Mar. 25, 1969

3,434,754
TWO-PIECE CAR TRUNK COVER
Paul J. Scaglione, 30180 Richmond Hill Drive,
Farmington, Mich. 48024
Filed Dec. 1, 1967, Ser. No. 687,171
Int. Cl. B62d 25/10, 25/12
U.S. Cl. 296—76         7 Claims

ABSTRACT OF THE DISCLOSURE

A car trunk cover which can be opened and moved upwardly and downwardly as a single unit, or which can be opened into two half-cover parts which are each adapted to be swung to a vertical position along one of the sides of a trunk opening so as to expose the top and rear side of the trunk opening for access thereto. The two trunk half-cover parts are adapted to be locked in the vertical position and serve as side protection panels for goods being carried in an upright position in the trunk.

---

This invention relates generally to the vehicle body construction art, and more particularly to a novel and improved two-piece car trunk cover which may also be used as a unitary car trunk cover in the conventional manner.

The trunks of present type automobiles are enclosed by trunk covers which are made as one-piece or unitary members and which are hinged at the front ends thereof so that they may be swung upwardly and downwardly to open and close the trunks. The trunk openings in said automobiles are normally constructed so that they are open on the upper side thereof and partially open on the rear side thereof, and they are enclosed by a unitary or single-piece trunk cover which has a downwardly curved rear end portion to enclose the rear end of the trunk opening. In many instances an automobile owner finds it necessary to haul items which project or extend from the trunk, and it is necessary with the conventional type trunk cover to tie the trunk cover down so that it does not bounce upwardly and downwardly when the automobile is moving. The hauling of projecting items of this type with the trunk open creates safety hazards because of wind resistance and the obstruction of the automobile's rear view mirror, so that the driver has to depend entirely on the automobile's side view mirror. Heretofore, attempts have been made to overcome the aforementioned problems by constructing a trunk cover made in two parts which were separately raised and disposed along each side of the trunk opening, and such a structure is shown in U.S. Patent No. 2,509,665. However, the trunk cover structure shown in the last mentioned patent does not provide a structure which can also offer the advantages and functions of a conventional trunk cover which can be swung upwardly and downwardly as a single unit.

In view of the foregoing, it is the primary object of the present invention to provide a car trunk cover that can be opened as a one-piece or unitary member and moved upwardly and downwardly in the same manner as a conventional trunk cover, or which can be opened separately or simultaneously as two half-cover parts or panels, with each half-cover part being adapted to be swung to a vertical position along a side of the trunk opening and to be releasably secured in said vertical position to serve as side protection panels for items carried in the trunk which extend upwardly out of the trunk, as for example, bicycles, lawn mowers and other bulky items.

It is another object of the present invention to provide a trunk cover for the trunk compartment of a vehicle which includes two half-cover panels, means for releasably locking said trunk half-cover panels in a closed position over the trunk compartment, means releasably attaching said trunk half-cover panels together for use of the trunk cover as a unitary cover, and hinge means operatively mounting each of said trunk half-cover panels to the vehicle body so that the two trunk half-cover panels may be moved as a unit between the opened and closed positions as a unitary trunk cover, or be moved between the opened and closed positions separately as individual half-cover panels and be swung to a vertical position along the sides of the trunk compartment when said means for attaching the trunk half-cover panels together is released.

It is a further object of the present invention to provide a trunk cover for the trunk compartment of a vehicle which is formed in two half-cover panels wherein each can be moved rearwardly and inwardly on an angular course away from the front and adjacent side edge of the trunk compartment, and then by means of a double acting, rotating hinge means, the trunk half-cover panels can each be rotated 90° to a vertical position along one side of the trunk compartment.

It is still another object of the present invention to provide a novel and improved trunk cover for a vehicle trunk compartment which comprises two releasably connected trunk half-cover panels, which is economical to manufacture, and which can be opened and closed in the conventional manner or wherein the trunk half-cover panels may be opened and closed separately.

Other objects, features and advantages of this invention will be apparent from the following detailed description, appended claims, and the accompanying drawings.

In the drawings:

FIG. 1 is a fragmentary, top plan view of the back end of an automobile having a trunk compartment at the rear thereof and provided with a trunk cover made in accordance with the principles of the present invention;

FIG. 2 is a fragmentary, right side elevational view of the structure illustrated in FIG. 1;

FIG. 3 is a fragmentary, top plan view, similar to 1, but showing both the left and right half-cover panels swung upwardly to a partially opened position;

FIG. 4 is a fragmentary, right side elevational view of the structure illustrated in FIG. 1, and showing the position the two-piece trunk cover assumes when it is open as a unitary member or when only a half-cover panel is opened;

FIG. 5 is a fragmentary, top plan view, similar to FIG. 1, but showing the trunk right half-cover panel moved to a fully opened vertical position and the trunk left half-cover panel moved to a partially opened position;

FIG. 6 is a fragmentary, right side elevational view of the structure illustrated in FIG. 5;

FIG. 7 is a fragmentary, top plan view, similar to FIG. 1, but showing both the left and right half-cover panels moved to their fully opened vertical positions;

FIG. 8 is a rear elevational view of the structure illustrated in FIG. 5, but with the trunk left half-cover in a fully closed position;

FIG. 9 is a rear end elevational view, similar to FIG. 8, but showing both the trunk left and right half-cover panels in fully opened vertical positions;

FIG. 10 is a silghtly enlarged, fragmentary, elevational section view of the structure shown in FIG. 8, taken along the line 10—10 thereof, and looking in the direction of the arrows;

FIG. 11 is a fragmentary elevational section view of the structure illustrated in FIG. 3, taken along the line 11—11 thereof, and looking in the direction of the arrows;

FIG. 12 is an enlarged, fragmentary plan view, with parts removed, of the structure illustrated in FIG. 2, taken along the line 12—12, and looking in the direction of the arrows;

FIG. 13 is a fragmentary, enlarged, elevational section view of the structure illustrated in FIG. 12, taken along the line 13—13 thereof, looking in the direction of the arrows, and showing the trunk right half-cover panel in the closed position;

FIG. 14 is a view similar to FIG. 13, but showing the trunk right half-cover panel swung to the fully opened vertical position;

FIG. 15 is an enlarged, fragmentary, elevational section view of the structure illustrated in FIG. 12, taken along the line 15—15 thereof, and looking in the direction of the arrows;

FIG. 16 is an enlarged, fragmentary, top plan view of the structure taken within the circle marked 16 in FIG. 1;

FIG. 17 is a slightly enlarged, fragmentary, elevational section view of the structure illustrated in FIG. 16, taken along the line 17—17 thereof, and looking in the direction of the arrows;

FIG. 18 is a fragmentary, slightly enlarged, elevational section view of the structure illustrated in FIG. 16, taken along the line marked 18—18 thereof, and looking in the direction of the arrows;

FIG. 19 is a fragmentary, enlarged, elevational view of the structure illustrated in FIG. 9, taken along the line marked 19—19 thereof, and looking in the direction of the arrows;

FIG. 20 is a fragmentary, enlarged horizontal section view of the structure illustrated in FIG. 19, taken along the line 20—20 thereof, and looking in the direction of the arrows;

FIG. 21 is a fragmentary, enlarged, horizontal elevational section view of the structure illustrated in FIG. 1, taken along the line 21—21 thereof, and looking in the direction of the arrows;

FIG. 22 is a fragmentary, enlarged top plan view of the structure shown in FIG. 21, taken along the line 22—22 thereof, and looking in the direction of the arrows; and, FIG. 23 is an enlarged, fragmentary, elevational view of the structure illustrated in FIG. 1, taken along the line 23—23 thereof, and looking in the direction of the arrows.

Referring now to the drawings, and in particular to FIGS. 1–9, the numeral 10 generally designates a conventional automobile which is provided with a trunk compartment 11, that is enclosed by a trunk cover generally indicated by the numeral 12 and which is made in accordance with the principles of the present invention. The trunk cover 12 comprises a left half-cover panel 13 and a right half-cover panel 14 which are each hinged to the body of the automobile 10 by a novel hinge means generally indicated by the numerals 15 and 16, respectively, in FIGS. 5 and 7.

As shown in FIG. 10, the right hinge means 16 comprises a hinge bracket 19 which is attached to the body of the automobile 10 by any suitable means, as by welding. The hinge means 16 further includes a hinge arm 20 which has the forward end thereof hingedly connected to the bracket 19 by any suitable means and which is also operatively connected to a conventional torsion bar 21. The rear end of the hinge arm 20 is turned upwardly and this upwardly turned end is indicated by the numeral 22 in FIGS. 10, 13 and 14. A pair of vertically aligned and apart hinge bolts 23 and 24 are mounted through the hinge arm end 22 and they extend through the semi-circular slot 25 which is formed in the hinge disc plate 26. The hinge disc plate 26 is retained on the bolts 23 and 24 by a vertically disposed retainer link or strap 27 and the nuts 28 and 29.

As shown in FIG. 12, the hinge disc plate 26 is integral with the mounting arm plate 30 which extends rearwardly therefrom at an angle of about 90°. Integrally formed on the rear end of the plate 30 at the inner end thereof is an elongated mounting arm 31 which is disposed at an angle relative to the longitudinal axis of the automobile. The mounting arm 30 extends rearwardly and inwardly toward the center line of the automobile 10 at an angle of about 45°. The rear end of the mounting arm 31 is turned downwardly to provide a suitable stop member 32.

As shown in FIG. 12, the mounting arm 31 is slidably mounted on a mounting bracket, generally indicated by the numeral 33, which is fixed to the inner side of the trunk half-cover panel 14 by any suitable means, as by welding. The bracket 33 comprises a plate 34 which is secured to the half-cover panel 14, and the integral downwardly extended flanges 35 and 36 through which are formed the slots 37 and 38, respectively. The mounting arm 31 is slidably mounted through the slots 37 and 38 and permits the half-cover panel 14 to be slid rearwardly and inwardly when it is released from its locked position of FIG. 1 so that it can be swung outwardly to the vertical position shown in FIG. 14 against one side of the opening of the trunk compartment 11.

It will be seen from an inspection of FIGS. 13 and 14 that the semi-circular slot 25 is approximately 180° in length. When the half-cover panel 14 is in the closed position shown in FIG. 13, the upper end of the semicircular slot 25 is seated against the top bolt 23 and the lower bolt 24 is positioned at about the middle or 90° point in the complete 180° length of the semicircular slot 25. At this position the half-cover panel 14 is disposed above the bolt 23 at a distance indicated by the line 39 in FIG. 13. When the half-cover panel 14 is swung upwardly and then backwardly and outwardly to the open position of FIG. 14, the distance between the bolt 23 and the panel 14 is increased as indicated by the numeral 40. It will be seen that the distance 40 is about twice the length of the distance 39.

It will be seen that the novel hinge means 16 permits the right half-cover panel 14 to be rotated about two axes which are spaced perpendicular to each other. The panel 14 is first lifted from the closed position shown in FIG. 1 to the normal open position shown in FIG. 4 by the hinged connection of the hinge arm 20 to the hinge bracket 19 and the normal action of the torsion bar 21. The half-cover panel 14 may then be slid inwardly and rearwardly along the mounting arm 31, and next swung about the semi-circular slot 25 so that its outer edge can dip down to clear the edge of the trunk compartment opening and be rotated downwardly into the trunk compartment. The half-cover panel 14 is simultaneously moved horizontally outwardly into the vertical position of FIG. 14, against the right side edge of the trunk opening. The left hinge 15 is constructed in the same manner as the aforedescribed left hinge 16, and the corresponding parts thereof are marked with the same reference numerals followed by the small letter a.

As shown in FIGS. 10, 19 and 20, the right half-cover panel 14 is provided with means, generally indicated by the numeral 41, for locking the panel 14 in the vertical position of FIGS. 10 and 14. As shown in FIG. 7, the left half-cover panel 13 is also provided with a similar locking means generally indicated by the numeral 41a. The panel locking means 41 comprises a plate 42 which is secured to the inside surface of the panel 14 by any suitable means, as by welding. The plate 42 is provided with a pair of inwardly extended, spaced apart flanges 43 having holes through which is slidably mounted a locking rod 44. The locking rod 44 is provided with an outwardly extended arm 45, which comprises another rod that is disposed perpendicular to the rod 44, as shown in FIG. 19. The arm 45 may be rested or disposed on a curved flange 46, formed on the plate 42, when the half-cover panel 14 is not in the locked position of FIGS. 10 and 14. The locking rod 44 may be slidably moved upwardly, as viewed in FIG. 10, and rotated on its longitudinal axis so as to permit the arm 45 to be moved upwardly and disposed on the curved flange 46. When the locking rod 44 is moved to its downward position as shown in FIG. 10, the lower end thereof extends through suitable holes in a pair of flanges 47 which are mounted on a supporting bracket that is suitably secured to the inside of the trunk compartment wall. In the position shown in FIG. 10, the locking rod 44 is rotated so as to bring the arm 45 under a flange 48 mounted on the inside of the trunk compartment wall. It will be understood that the flanges 43, 46, 47 and 48 may be alternatively formed by stamping them from the panel 14. It will also be understood that the locking means 41 is merely illustrative of one suitable means for locking the half-cover panel in the vertical open position.

As shown in FIGS. 10 and 11, the right half-cover panel 14 is provided with a vertically disposed guide plate 49 on the forward inner corner thereof. The outer face of the plate 49 is curved so as to prevent injury to the adjacent left half-cover panel 13 when the overlapping panel 14 is moved to the closed position of FIG. 1. The guide plate 49 is secured by means of a flange 50 to the inside of the panel 14.

The trunk cover 12 is provided with means for locking the half-cover panels 13 and 14 together so as to permit these panels to be lifted upwardly as a unit by the automobile's conventional torsion bars, so that both of these panels would be in the position indicated by the panel 14 in FIG. 4. As shown in FIGS. 10, 16, 17 and 18, a first downwardly extended locking flange 51 is mounted on the front inner corner of the right half-cover panel 14 by an integral flange 52. The flange 52 is fixed to the inside surface of the half-cover panel 14 by any suitable means, as by welding. When the half-cover panels 13 and 14 are in the closed position shown in FIG. 18, the flange 51 extends downwardly into locking engagement with a sleeve member 53 that is secured to the inner surface of the panel 13, along the inner side edge thereof, by any suitable means, as by welding.

As shown in FIGS. 10, 21 and 22, a second locking flange 54 is mounted on the right half-cover panel 14 along the inner edge thereof, at the rear inner corner. The locking flange 54 extends downwardly and is adapted to be seated in a locking sleeve 56 mounted on the inside surface of the left half-cover panel 13. The locking flange 54 is secured to the right half-cover panel 14 by the integral flange 55 which is affixed to the panel 14 by any suitable means, as by welding.

The locking flange 54 is releasably secured to the sleeve 56 by a locking pin 57 which is shown in FIGS. 21 and 22. The locking pin 57 is slidably mounted through suitable holes formed in the locking flange 54 and the sleeve 56. As shown in FIG. 10, the locking pin 57 is integral with a rearwardly extended rod 58 which is also integral with a transverse rod 59 that is slidably supported by a bracket 60 which is secured to the inside of the panel 14 by any suitable means, as by welding. A longitudinally extended rod 61 is integral with the rod 59 and it protrudes through an opening 62 in the rear downwardly extended portion of the half-cover panel 14, as shown in FIG. 23. A handle 63 is attached to the protruding end of the rod 61, whereby the locking pin 57 may be transversely moved in and out of locking engagement with the flange 54 and the sleeve 56. It will be understood that the aforedescribed illustrative panel locking means is merely one type of locking means that may be used to releasably attach the two half-cover panels 13 and 14 together.

The trunk 12 may be provided with a conventional means for locking the trunk in position as a unit. For purposes of illustration, one type of trunk locking means has been illustrated in FIG. 23 and comprises a latch or hook member 64 which is rotatably mounted on the shaft 65 that is rotatably mounted on the left half-cover 13. The latch 64 is on the inside of the trunk and is adapted to be moved to a locking position so as to overlap the stationary pin 66 mounted on the body of the vehicle inside the trunk. The latch 64 would be normally moved to the closed or locking position by a spring 67. The latch 64 is moved in a clockwise direction as viewed in FIG. 23, to release the trunk cover as a unit by the handle 68. The handle 68 is fixed to the outer end of the shaft 65 which extends through the trunk half-cover panel 13.

It will be understood that the hinge means 15 also includes a hinge arm similar to the hinge arm 20 which is also hingedly connected to a bracket like the bracket 19 and to a conventional torsion bar like 21. The two torsion bars 21 for the two hinge means 15 and 16 would be conventional torsion bars commonly used for the two individual trunk cover hinges in the present-type automobiles. It will be seen that this is an advantage since the novel two-piece trunk cover of the present invention may be opened by such conventional torsion bars without the need for providing special torsion bars, springs, or the like. Accordingly, when the lock means used on the trunk cover of the present invention is unlocked, the trunk cover will pop up as a unitary cover in the same manner as a conventional trunk cover of an automobile. When it is desired to use the two-piece trunk cover of the present invention as two separate half-covers, it is merely necessary to move the locking pin 27 to the unlocked position, and the torsion bar 21 operating on the hinge means 16 for the panel 14 will create an opening force on the right half-cover panel 14 so that it will pop upwardly to an open position in the same manner as when the trunk cover is opened as a unitary cover. In the latter case, the operator can then quickly and easily slide the right half-cover panel 14 rearwardly and inwardly, and then outwardly to the open vertical position. If a large item, or a number of items, is going to be carried in the trunk, then the left half-cover panel 13 may be opened by merely unlocking the usual lock which holds the entire cover down, to permit the left half-cover panel 13 to pop up to an open position, from whence it may be slid rearwardly and inwardly, and then rotated outwardly and locked in place in the fully open vertical position.

It will be understood that the novel double acting hinge means 15 and 16 of the present invention permits the half-covers 13 and 14 to be moved inwardly and rearwardly so that they can clear the drain channel which is normally formed around a trunk opening, so that the trunk half-covers may be moved to the aforementioned vertical positions along the sides of the trunk opening. This novel functioning is provided by the rotating hinge disc plate 26 with its semi-circular bolt slot 25. This novel hinge structure functions so that when a half-cover panel 13 or 14 is rotated 90° from a horizontal position to the vertical position, it will rise from the center of the hinge means to a higher center-line, then the outer edge of the panel will dip down sharply to clear the side edge of the trunk opening to permit the panel to be rotated downwardly into the trunk compartment and then be moved horizontally outward into a vertical position along the side edge of the trunk opening.

While it will be apparent that the preferred embodiment of the invention herein disclosed is well calculated to fulfill the objects above stated, it will be appreciated that the invention is susceptible to modification, variation and change.

What I claim is:

1. In a vehicle body having a trunk compartment, the combination of:
   (a) a trunk cover comprising two half-cover panels;
   (b) means for releasably locking said trunk half-cover panels to the vehicle body in a closed position over the trunk compartment;
   (c) means for releasably locking said trunk half-cover panels together with the inner edges of the half-cover panels in mating engagement with each other, for using the trunk cover as a unitary cover; and,
   (d) a double acting means for hingedly mounting each of said trunk half-cover panels to the vehicle body so that the two trunk half-cover panels may be swung as a unitary trunk cover between the closed and opened positions, or be swung as separaate half-cover panels from the closed position to a vertical opened position along the sides of the trunk compartment when said means for releasably locking the trunk half-cover panels together is released.

2. In a vehicle body having a trunk compartment, the combination as defined in claim 1, including:
   (a) means for locking each of said trunk half-cover panels in said vertical opened position along a side of the trunk compartment.

3. In a vehicle body having a trunk compartment, the combination of:
   (a) a trunk cover comprising two half-cover panels;
   (b) means for releasably locking said trunk half-cover panels to the vehicle body in a closed position over the trunk compartment;
   (c) means for releasably locking said trunk half-cover panels together for using the trunk cover as a unitary cover;
   (d) hinge means for hingedly mounting each of said trunk half-cover panels to the vehicle body so that the two trunk half-cover panels may be swung as a unitary trunk cover between the closed and opened positions, or be swung as separate half-cover panels from the closed position to a vertical opened position along the sides of the trunk compartment when said means for releasably locking the trunk half-cover panels together is released; and,
   (e) each of said hinge means being constructed and arranged so that the trunk half-cover panel supported by each hinge means may be rotated about a first axis to swing the trunk half-cover panel upwardly from a closed position to an opened position, and thence rotated about a second axis perpendicular to said first axis so that the said trunk half-cover panel may be swung to said vertical position along one of the sides of the trunk compartment.

4. In a vehicle body having a trunk compartment, the combination as defined in claim 3, including:
   (a) means for attaching each of said trunk half-cover panels to its respective hinge means so that the trunk half-cover may be moved horizontally rearward and inward relative to the trunk compartment so that the outer side of the trunk half-cover panel may be swung downwardly into the trunk compartment and the entire half-cover panel then moved outwardly to said vertical position.

5. In a vehicle body having a trunk compartment, the combination as defined in claim 3, wherein:
   (a) each of said hinge means includes a hinge arm having one end hingedly mounted to the vehicle body on a horizontal axis transverse of the vehicle body, a hinge plate attached to the trunk half-cover panel, and means for rotatably mounting said hinge plate on the other end of said hinge arm on an axis perpendicular to the first mentioned axis.

6. In a vehicle body having a trunk compartment, the combination as defined in claim 5, wherein:
   (a) said means for rotatably mounting said hinge plate on the other end of said hinge arm includes a pair of vertically spaced apart bolts mounted on said other end of said hinge arm, and said hinge plate is provided with a semi-circular bolt slot through which is received said last mentioned two bolts for rotatably mounting said hinge plate on said other end of said hinge arm.

7. In a vehicle body having a trunk compartment, the combination as defined in claim 5, wherein:
   (a) said hinge plate is provided with a mounting arm extended rearwardly and inwardly toward the center-line of the vehicle body at an angle of about 45° relative to the longitudinal axis of the vehicle body, and said trunk half cover panel carried by the hinge plate is provided with a mounting bracket which is fixed to the panel slidably supported on said mounting arm.

References Cited

UNITED STATES PATENTS

| | | | |
|---|---|---|---|
| 1,136,643 | 4/1915 | Berryman | 296—76 |
| 2,509,665 | 5/1950 | Apel | 296—37 |
| 3,004,790 | 10/1961 | Mayer | 296—26 |
| 3,216,760 | 11/1965 | Buchwald | 296—76 |

BENJAMIN HERSH, *Primary Examiner.*

L. DANIEL MORRIS, Jr., *Assistant Examiner.*

U.S. Cl. X.R.

49—192